US011060645B2

(12) United States Patent
Vasquez

(10) Patent No.: US 11,060,645 B2
(45) Date of Patent: Jul. 13, 2021

(54) DUCT CLEANING ACCESS DOOR

(71) Applicant: Alex Vasquez, Romeoville, IL (US)

(72) Inventor: Alex Vasquez, Romeoville, IL (US)

( * ) Notice: Subject to any disclaimer, the term of this patent is extended or adjusted under 35 U.S.C. 154(b) by 0 days.

(21) Appl. No.: 16/256,622

(22) Filed: Jan. 24, 2019

(65) Prior Publication Data

US 2019/0154179 A1 May 23, 2019

Related U.S. Application Data

(62) Division of application No. 14/217,339, filed on Mar. 17, 2014, now Pat. No. 10,197,202.

(60) Provisional application No. 61/801,447, filed on Mar. 15, 2013.

(51) Int. Cl.
| | | |
|---|---|---|
| *F16L 37/00* | (2006.01) | |
| *F16L 55/115* | (2006.01) | |
| *F24F 13/02* | (2006.01) | |
| *F16L 45/00* | (2006.01) | |
| *B08B 9/032* | (2006.01) | |
| *F16L 33/22* | (2006.01) | |

(52) U.S. Cl.
CPC .......... *F16L 37/004* (2013.01); *B08B 9/0328* (2013.01); *F16L 45/00* (2013.01); *F16L 55/115* (2013.01); *F24F 13/02* (2013.01); *F24F 13/029* (2013.01); *F16L 33/223* (2013.01); *F16L 37/008* (2013.01); *F24F 2221/22* (2013.01)

(58) Field of Classification Search
CPC ....... F16L 37/004; F16L 37/008; F16L 45/00; F16L 55/115; B08B 9/0328; F24F 13/02; F24F 2221/22; F24F 7/00; F24F 2007/003; F24F 13/029; F24F 13/20; F24F 2009/005

See application file for complete search history.

(56) References Cited

U.S. PATENT DOCUMENTS

| | | | | |
|---|---|---|---|---|
| 3,571,977 A | * | 3/1971 | Abeel | E05B 51/023 49/379 |
| 4,012,058 A | * | 3/1977 | Patton | F01N 13/1805 285/9.1 |
| 4,398,371 A | * | 8/1983 | Jenkins | A62C 2/12 160/1 |
| 5,080,403 A | * | 1/1992 | Paoluccio | F16L 41/00 285/189 |
| 5,096,230 A | * | 3/1992 | Pausch | B08B 15/00 285/304 |
| 5,722,181 A | * | 3/1998 | Meyer | D06F 58/20 34/235 |
| 5,724,701 A | * | 3/1998 | Jones | B01D 46/0032 15/304 |

(Continued)

*Primary Examiner* — James M Hewitt, II
(74) *Attorney, Agent, or Firm* — Erickson Law Group, PC

(57) ABSTRACT

A magnetic duct access door provides for frequent access to a variety of different kinds of duct. The access door allows for an efficient magnetic attraction to a metallic duct and easy manual removal of the access door by tilting the access door via handles on its front surface. The access door includes: an access door base; a plurality of magnets arranged around the periphery of the back surface of the access door base; a compressible sealing member located between the magnetic attachment pads on the back surface of the access door base; at least one handle portion extending from the front surface of the access door base.

16 Claims, 6 Drawing Sheets

(56) References Cited

U.S. PATENT DOCUMENTS

| | | | | |
|---|---|---|---|---|
| 7,549,258 | B2* | 6/2009 | Lajewski | F24F 13/084 439/544 |
| 7,946,545 | B2* | 5/2011 | Nurenberg | F24F 13/078 248/222.41 |
| 2005/0052018 | A1* | 3/2005 | Pichotta | F16L 25/0018 285/9.1 |
| 2006/0065308 | A1* | 3/2006 | Rogge | F24F 11/72 137/527 |
| 2010/0190432 | A1* | 7/2010 | Viggers | F24F 13/20 454/275 |
| 2012/0238200 | A1* | 9/2012 | Berkovitz | F24F 13/082 454/367 |
| 2013/0285365 | A1* | 10/2013 | Davis | F16L 37/004 285/9.1 |
| 2014/0123561 | A1* | 5/2014 | Chwala | E06B 3/04 49/465 |

\* cited by examiner

DUCT CLEANING ACCESS DOOR

This application is a divisional application of U.S. Ser. No. 14/217,339, filed Mar. 17, 2014, now U.S. Pat. No. 10,197,202, which claims priority to U.S. Provisional Application Ser. No. 61/801,447 filed Mar. 15, 2013.

BACKGROUND OF THE INVENTION

1. Field of the Invention

The present invention is directed to an improved clamp for attaching a Heating, Ventilation and Air-Conditioning (HVAC) duct cleaning hose to an HVAC duct to be cleaned. More particularly, the invention is directed to a novel duct cleaning clamp that is inexpensive to manufacture, provides a strong sealing connection between hose and duct, and is more efficiently mounted to and removed from the duct. The invention is also directed to methods of manufacture and use of such improved duct cleaning clamps. Invention is still further directed to an improved duct access door for permanent, or semi-permanent installation on a duct for which frequent access for inspection or cleaning is required.

2. Description of the Prior Art

During operation of forced air HVAC systems, dust and other particulates including allergens, such as, mold spores, pollen, and pet dander can accumulate in the duct work over time. In order to ensure that the air circulated by the HVAC system is clean and promotes good health, the system duct work should be periodically cleaned so that such particulates, particularly any allergens, are removed from the ducts. In order to clean an HVAC duct, a duct cleaning technician typically creates a hole in the side of a duct and then clamps an airflow hose to the duct around the periphery of the hole. The hose is typically connected on its other end to a HVAC duct cleaning base unit. The function of the duct cleaning base unit is to create rapid airflow (using either negative or positive air pressure) within the duct in order to blow or suck the dust and other particulates from the interior of the duct. In many cases, two HVAC duct cleaning base units are used to clean a single duct run; one unit that blows air into the duct at an upstream location (near a return vent) and another that sucks air from the duct at a downstream location (nearer the HVAC unit air inlet). In order to efficiently clean the duct, the duct cleaning hose(s) must be sealed against the duct around the periphery of the hole so that the airflow provided by the hose(s) is directed entirely within the duct. In order to create that peripheral seal with the duct, the duct cleaning hose(s) typically attaches to a flange on a clamping device, which clamping device is in turn designed to create a seal with the duct peripheral to the hole.

One commonly used prior art duct clamp is a "hinge clamp" which includes a plurality of mechanical hinges mechanisms located on the inner peripheral edge of flange portion of the clamp. The use of "hinge clamps" typically requires that the technician create a precisely dimensioned circular hole in the duct so that the hinging mechanisms are properly positioned to swing into an engagement position in which they grasp the interior wall of the duct adjacent to the hole. If the dimensions of the hole are inaccurate, one or more of the hinging mechanisms may fail to grasp the interior wall of the duct so that the clamp improperly seals, or in the worst case scenario, may even fall off during the cleaning operation. The creation of such a precisely dimensioned circular hole takes the technician a considerable amount of time. Also, patching circular holes after completion of the cleaning operation is more difficult and time consuming for the technician than patching square or rectangular holes. An alternate prior art clamp device is a "screw mount clamp" which utilizes a number of screws passing through a base portion of the clamp and then passing through to the interior of the duct. The mounting and removal of such "screwed mount clamps" typically require the technician to hold the clamp and hose with one hand while using a hand tool to mount the screws. The screws also create additional holes in the duct that need to be patched after the completion of the duct cleaning operation. Applicant has determined that the processes of installation and removal of both these styles of prior art clamps take longer than is desirable. Moreover, the "hinge style" duct clamping mechanisms of the prior art required a number of precision dimension tolerance metal parts and therefore were relatively expensive to manufacture. Although the "screw mount" prior art clamps were typically less expensive than the "hinge type" to manufacture, they usually where significantly more time consuming to install and remove from the duct. Despite these shortcomings of prior art clamps, past attempts to design and manufacture an inexpensive clamping device which can be efficiently installed and removed from the duct have failed.

Another prior art duct cleaning clamp was designed to cover a HVAC air return grate. This product included a long pole that had a spring member attached to one end of the pole with a duct cleaning grate adapter attached to the other end. The cleaning unit hose attached to the middle of the duct grate adapter and the pole was the wedged between the floor and the location of the duct in an attempt to hold the duct cleaning grate adapter over the return grate. Such prior art spring-loaded duct cleaning grate adapters suffer from a number of difficulties. First, the spring-loaded duct cleaning grate adapters are difficult to install since frequently will push a return grate mounted in a suspension ceiling back up into the suspension area. This can damage the flexible return duct that is frequently used in suspension ceilings and can also damage the great or adjacent suspension tiles. Second, when installing a prior art spring-loaded duct cleaning adapter onto a wall mounted return grate, the pole and spring member were often times wobbly and unstable to the point that the adapter would fall off the grate during the cleaning operation.

A related problem to those discussed above is providing access to ducts that need to be cleaned or inspected on a more frequent basis. Such frequent access ducts can be HVAC ducts or other ducts. For example, many industrial food processing facilities utilize frequent access ducts for ventilation of food processing areas or for delivery of particular materials to food processing equipment. One way that access is provided for frequent access ducts is to install a permanent or semi-permanent recloseable door on the duct. In a manner similar to the prior art duct cleaning clamping technology, the most commonly used access doors are of a "hinge style," which requires installation a plurality of mechanical hinges mechanisms located on the inner peripheral edge of a flange portion of the access door. The use of such "hinge style access doors" typically requires that an installation technician create a precisely dimensioned circular hole in the duct so that the hinging mechanisms are properly positioned to engage the interior wall of the duct adjacent to the hole. If the dimensions of the hole are inaccurate, one or more of the peripheral hinging mechanisms may fail to grasp the interior wall of the duct so that the access door will improperly seal, or in the worst case scenario, may even fall off the duct. The creation of such a precisely dimensioned circular hole takes the technician a considerable amount of time. Applicant has perceived a need to provide a recloseable duct access door which is more economical to manufacture and more efficient and economical to install into on a frequent access duct.

OBJECTS OF THE INVENTION

It is one object of the invention to provide a quick installation duct hose clamp that is less expensive to manufacture than prior art "hinge clamp" designs.

It is a further object of the invention to provide a duct hose clamp that is more easily installed, removed, and allows for more efficient duct hole creation and patching than prior "hinge clamp" designs.

It is another object of the invention to provide an easy to install and remove duct hose clamp that can accommodate duct holes of a variety of shapes and sizes.

It is still further object of the invention to provide an inexpensive duct hose clamp that can be both installed and removed in a matter of seconds.

It is still another object of the invention to provide a faster, more efficient method of cleaning HVAC ducts by use of a more efficiently installed and removed duct hose clamp.

It is another object of the invention to provide a duct hose clamp that can be installed on certain types of duct work without having to cut any holes in the duct.

It is still another further object of the invention to provide a method of cleaning a duct utilizing a duct hose clamp that can be efficiently mounted to a duct vent cover of predetermined dimensions thereby avoiding the necessity of cutting a hole in the sidewall of the duct.

It is a still further object of the invention to provide a stable, easy to install duct grate cleaning adapter.

It is a further object of the invention to provide a method to inexpensively manufacture a quick installation duct cleaning hose clamp.

It is another object of the invention to provide a recloseable duct access door which is less costly to manufacture and more efficient and economical to install onto a frequent access duct.

SUMMARY OF THE INVENTION

The present invention is directed to an improved duct cleaning hose clamp for attaching an airflow hose to a HVAC duct to be cleaned, the improved duct cleaning hose clamp includes: a planar clamp base; a plurality of magnets arranged around the periphery of the back surface of the clamp base; a compressible sealing member located between the magnetic attachment pads on the back surface of the clamp base; at least one handle portion extending from the front surface of the clamp base; a duct cleaning hose mounting portion protruding from the front surface of the clamp base; a duct cleaning hose mounting portion defining a central aperture which is in fluid communication with a remote HVAC duct cleaning base unit. The design of the improved clamp allows for creation of an efficient magnetic seal with a metallic HVAC duct and easy manual removal of the clamp by tilting the clamp via the handles on its front surface. The improved duct cleaning hose clamp is inexpensive to manufacture because it can be constructed primarily of molded thermoplastic parts, which significantly reduces manufacturing costs. In one preferred embodiment of the invention, the planar clamp base has a rim portion extending from its back surface, which helps to retain the sealing member and the plurality of magnets in place and to ensure a quality seal with the duct. In another preferred embodiment of the invention, the sealing gasket is an enlarged foam pad covering substantially the entire back surface of the clamp base peripheral to the central aperture (except for the portion of the back surface where the plurality of magnets are mounted), which allows for significant variance in the shape and size of the hole cut in the duct to receive the clamp.

In another aspect of the invention, an improved duct cleaning hose clamp is provided which is designed to efficiently mount to metallic duct grates of predetermined standard sizes. The duct grate mountable cleaning hose clamps includes: a planar clamp base dimensioned to engage flat metallic portions of the duct grate of a metallic duct grate of a predetermined standard size; a plurality of magnets located on the back surface of the clamp base at locations which correspond to substantially planar metallic portions of the duct grate of a predetermined standard size in order to magnetically bond thereto after installation of the clamp thereon; at least one handle portion extending from the front surface of the clamp base; a hose mounting portion protruding from the front surface of the clamp base; a central aperture defined by the hose mounting portion for receipt of an airflow hose in fluid communication with a remote HVAC duct cleaning base unit; and a compressible sealing member located between the plurality of magnetic attachment pads on the back surface of the clamp base to create a seal with portions of the duct grate peripheral to the central aperture.

In a still further aspect of the invention, an improved method of a cleaning a HVAC duct is provided, which includes the steps of: providing a HVAC duct cleaning base unit for causing high velocity airflow within the duct to be cleaned; attaching a duct cleaning hose to the duct cleaning base unit to transfer the airflow to the duct to be cleaned; providing a magnetically mountable duct cleaning hose clamp having a plurality of magnetics and having a sealing member disposed between the plurality of magnets; attaching the duct cleaning hose to the magnetically mountable duct cleaning hose clamp; placing the magnetically mountable duct cleaning hose clamp onto the duct to be cleaned so that the plurality of magnets attract the metallic duct and thereby compress the sealing member to create a seal between the clamp and duct; activating the HVAC duct cleaning base unit so that airflow is provided to the duct cleaning hose and directed through the mounted magnetically mountable duct cleaning hose clamp into the duct to be cleaned, removing particulates from the duct to be cleaned; and detaching the magnetically mountable duct cleaning hose clamp by first tilting the clamp relative to the now cleaned duct to break the magnetic attachment between at least a portion of the metallic duct and the plurality of magnets and then by pulling the clamp away from the duct.

In another aspect of the invention, an improved method of a cleaning a HVAC duct having a metallic return grate of predetermined dimensions is provided, which includes the steps of: providing a HVAC duct cleaning base unit for providing airflow within the duct to be cleaned; attaching a duct cleaning hose to the duct cleaning base unit to transfer the airflow to the duct to be cleaned; providing a magnetically mountable duct cleaning hose clamp having a plurality of magnets spaced apart a predetermined distance to correspond to a plurality of flat metallic portions of the return grate and having a compressible sealing member arranged to be compressed by portions of the return grate to create a seal between the clamp and return grate; attaching the duct cleaning hose to the magnetically mountable duct cleaning hose clamp; placing the magnetically mountable duct cleaning hose clamp onto a return grate of predetermined dimensions so that the plurality of magnets attract portions of the return grate and thereby compress the sealing gasket onto portions of the return grate to create a seal between the clamp and return grate; activating the HVAC duct cleaning base unit so that high velocity airflow is provided to the duct cleaning hose, passes through the magnetically mountable duct cleaning hose clamp, the return grate and into the duct to be cleaned; removing particulates from the duct to be cleaned; and detaching the magnetically mountable duct cleaning hose clamp by first tilting the clamp relative to the return grate over the now cleaned duct to break the magnetic attachment between at least a portion of the return grate and the plurality of magnets and then by pulling the remainder of the clamp away from the return grate to brake the magnetic attachment between the remainder of the plurality of magnets and the return grate.

Another embodiment of the invention provides an improved duct access door for providing temporary access to the interior of a duct during a reoccurring access event and for repeatedly sealing the duct after each access event, the improved duct access door comprising: a duct access door base having a front and back surface; a plurality of magnets arranged around the periphery of the back surface of the duct access door base; a compressible sealing member located between the plurality of magnetic attachment pads on the back surface of the duct access door base; and at least one handle portion extending from the front surface of the duct access door. In one preferred embodiment of the invention, the improved duct access door has a substantially planar duct access door base, which is designed for installation on square or rectangular ducts. In another preferred embodiment the invention, the improved access door has a duct access door base, which is substantially curvilinear with a radius of curvature matching the predetermined radius of curvature of the exterior of a duct. The duct access doors with the curvilinear duct access door base are designed for installation on round ducts or other ducts having curved exterior surfaces. Preferably, the duct access door base of the duct access doors of the invention are molded from a thermoplastic resin. It is also preferred that the duct access doors of the invention have a peripheral rim portion extending from their back surface for retaining the sealing member and the plurality of magnets to ensure a quality seal with the duct. The distance that the peripheral rim extends from the back surface of the duct access door base is also preferably less than the thickness of the compressible sealing member.

DETAILED DESCRIPTION

Figure 1:
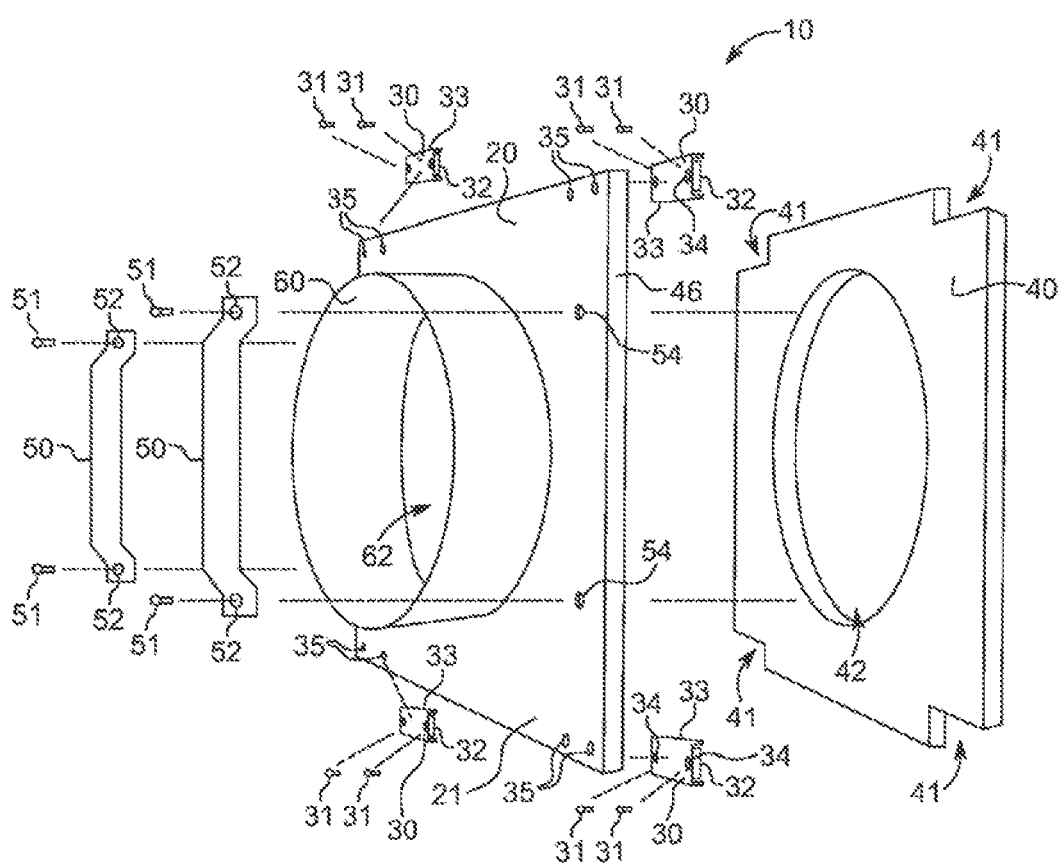
FIG. 1 is a front side, exploded perspective, view of a magnetic duct cleaning hose clamp in accordance with one embodiment of the invention.

This application is a divisional application of U.S. Ser. No. 14/217,339, filed Mar. 17, 2014 which is incorporated by reference in its entirety.

The magnetic cleaning hose clamp 10 in accordance with the embodiment of FIGS. 1-5 generally includes a planar clamp base 20; magnetic attachment pads 30 extending from the back surface 22 of the planar clamp base 20 with the magnetic pads 30 being located at the four corners of the back surface 22; a compressible sealing material 40 arranged between the magnetic attachment pads 30 on the periphery of the back surface 22; a rim 46 extending outwardly from the periphery of the back surface 22; handles 50 extending from the front surface 21 of the planar clamp base 20; and a hose mounting ring 60 protruding from the front surface 21 of the planar clamp base 20, which mounting ring 60 defines a central aperture 62 to allow airflow to a remote HVAC duct cleaning device base unit 80. The design of magnetic cleaning hose clamp 10 allows for creation of a strong magnetic seal against the metallic HVAC duct that can be installed in a matter of seconds. All that is necessary is to bring the magnetic cleaning hose clamp 10 within several inches of the duct cleaning hole 72 and the magnetic cleaning hose clamp is drawn instantaneously into strong contact with the peripheral area 74 surrounding the duct cleaning hole 72 which causes the compressible sealing gaskets 40 to form a virtually airtight seal with the duct 70. Moreover, the magnetic cleaning hose clamps of the invention can be quickly and easily manual removal by tilting the clamp via the handles on its front surface until the force of magnetic attraction is broken along one side of the clamp. Further, duct cleaning hole 72 can be any shape or of any size that is smaller than the exterior dimensions of the planar clamp base 20. This eliminates the need for the cutting of a precisely dimensioned circular duct access holes as was required for the prior art "hinge clamp" quick release duct cleaning hose clamps.

Returning to FIG. 1 in greater detail, planar clamp base 20, rim 46 and hose mounting ring 60 are preferably injection molded in a single integral piece from a suitable thermoplastic resin. The preferred resin performing the planar clamp base 20, rim 46 hose mounting ring 60 is poly carbon, but other strong, lightweight thermoplastic resins such as Poly-propylene may be used. Four pairs of holes are drilled into the planar clamp base 20 at each of its four corners for receipt of pad attachment fasteners 31, and four handle attachment apertures 54 are also drilled in the planar clamp base 20. The pad attachment fasteners 31 are preferably pop rivets, but nuts and bolts or machine screws may also be used to fasten the magnetic attachment pads 30 to the planar clamp base 20. While forming the planar clamp base 20, rim 46 and hose mounting ring 60 from thermoplastic is preferred for cost reasons, those structures may also be fabricated from sheet metal.

Figure 2:
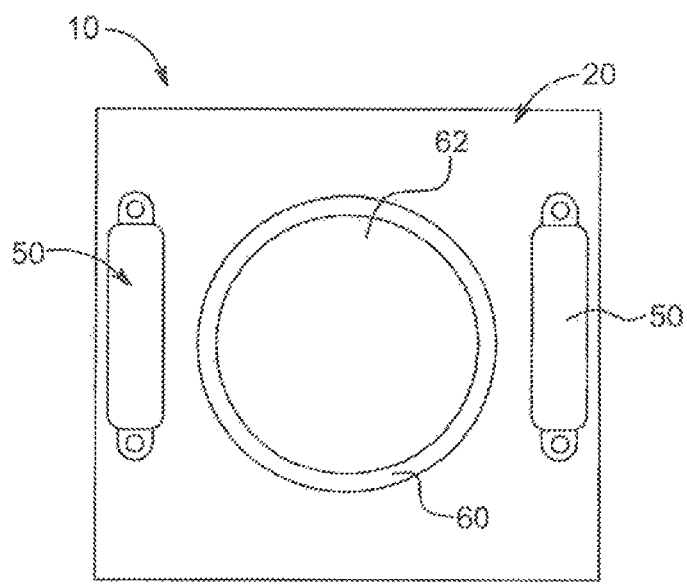
FIG. 2 is a front plan view of the magnetic duct cleaning hose clamp in accordance with the embodiment of FIG. 1.

As best seen in FIGS. 1 and 2, magnetic attachment pads 30 include a magnet 32, the frame portion 33 for holding the magnet 32 and a pair of fastener receipt bores 34. When the attachment pad fasteners 31 are threaded machine screws, a lock washer is placed between the attachment pad and planar clamp base 20 and the bore 34 of the fastener is internally threaded. The attachment pads fasteners 34 pass through base pad apertures 35 and into the attachment pad frame aperture 36. Applicant has found that the use of four magnetic pad rated for 25 pounds of force mounted at each of the corners of planar clamp base 20 provide a sufficiently strong bond with the duct 70 that the hose 82 and clamp 20 do not come loose inadvertently during a cleaning operation, but can easily be removed by tilting one side of the planar clamp base 20 off of the duct 70 by means of handles 50. While the preferred magnetic force rating for the magnet portions 32 is twenty five pounds per magnet, other stronger or weaker magnets can be used depending upon the job contemplated. For example, if it very heavy duty duct cleaning hose is to be used or if the duct to be cleaned contains mold spores or other noxious particulates, magnet portions 32 with ratings in excess of 25 pounds of force may be used in the magnetic hose clamp 10. The preferred materials for the magnet 32 are the strong, lightweight rare earth types, such as, neodymium magnets (Nd.sub.2Fe.sub.14B) and samarium-cobalt magnets, but metal ferrite or ceramic magnets may also be used. Of course, with the use of magnets rated higher than 25 pounds of force, removal of the clamp after completion of the job becomes more difficult. Similarly, while it is preferred that for magnetic attachment pads 30 are placed at the four corners of the square or rectangular shaped magnetic cleaning hose clamps of the invention, additional magnetic attachment pads can be used along the periphery of the back surface 22 of the clamp base to increase the clamping force of the magnetic hose clamp 10. The magnetic hose clamp 10 can also be used to temporarily attach a cleaning hose to another structure that needs periodic cleaning such as an industrial powder dispensing apparatus, particularly those used in the food industry, which need nearly daily cleansing. For those applications, it may be necessary to use stronger magnets or larger number of magnets to ensure that the clamp does not become dislodged during the equipment cleaning process in order to avoid a risk of contaminating the equipment.

Compressible sealing material 40 is preferably die cut from a relatively compressible foam material blank such as foam-rubber buana-n/pvc or pvc foam insulation blanks. The die cut shape has four corner cut outs 41 to accommodate the magnetic attachment pads 30 and a center cutout 42 that matches the dimensions of the central aperture 62. The height and width of the compressible sealing material closely matches the interior height and width dimensions of the planar clamp base 20 between opposing rim inner surfaces 47 on the back surface 22. The compressible sealing material 40 is cut to a thickness that is greater than the thickness of the magnetic attachment pads 30, but slightly less than the height of the rim 46. The tight fit of the compressible sealing material 40 within the confines of the rim 46 assists in forming a nearly airtight seal when the magnetic cleaning hose clamp 10 is mounted to a duct 70. The compressible sealing material 40 is preferably mounted to the back surface 22 of the planar clamp base 20 by use of an adhesive such as 3M-scotch weld adhesive, but may also be mounted to the planar base portion via fasteners (not shown). Alternately, the sealing material can be cut into four elongated strips (not shown) that that match the distance between each of the magnetic attachment pads 30. The elongated strips can be glued to the back surface 22 adjacent to the rim 46 between each of the four magnetic attachment pads 30.

Figure 3:
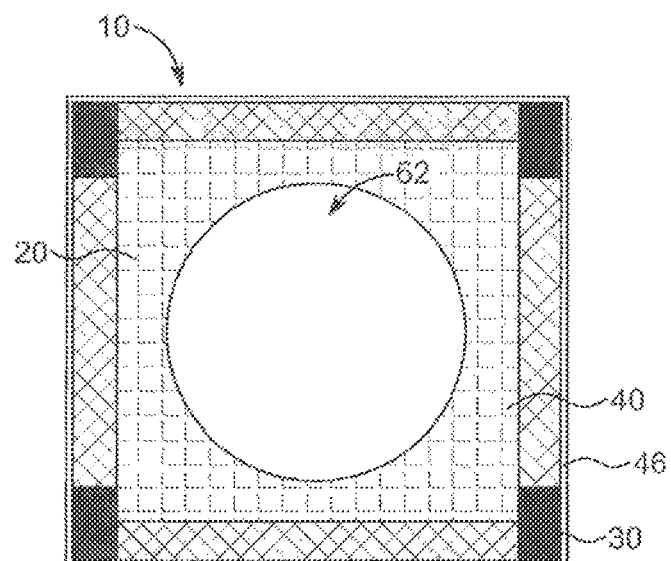
FIG. 3 is a rear plan view of the magnetic duct cleaning hose clamp of FIG. 1.
Figure 4:
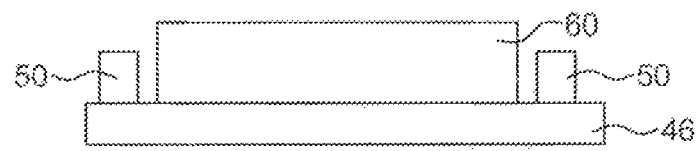
FIG. 4 is a side plan view of the parts of the magnetic duct cleaning hose clamp in accordance with the embodiment of FIG. 1.

As best seen in FIGS. 2 and 3, the rim 46 preferably has a height of about ⅜ of an inch and a width of about ⅛ of an inch. The rim 46 assists in retaining the magnetic pad attachment pads 30 and the compressible sealing material 40 in place during mounting and dismounting of the magnetic hose clamp from the duct 70. This is done by ensuring that the outer exterior side wall of the magnetic attachment pads 30 butts up against the rim 46 and by ensuring that the compressible sealing material is cut to be slightly larger size than the interior width and height of between opposing sides of the rim 46.

The pair of handles 50 are mounted to the front surface 21 of the planar clamp base 20 via handle fasteners 51. The handle fasteners 51 are preferably pop rivets, but nuts and bolts or screws may also be used to fasten the handles 50 to the planar clamp base 20. The handle fasteners 51 pass through handle apertures 52 and into base handle apertures 53. Alternately, the handle fasteners 51 may also pass through the compressible material 40 (not shown) so that the compressible material is both adhesively bounded and fastened to the back surface 22 of the planar clamp base 20. The handles 50 are preferably fabricated from lightweight aluminum plate stock and crimped into the desired shape and then the handle apertures 52 are drilled therein. While aluminum alloys are the preferred material for the handles 50 due to its lightweight, other metals such as tin, steel, or nickel alloys may also be used.

Hose mounting ring 60 is preferably at least two and one half inches in height so that there is adequate room to accept a hose strap clamp 76 for securing the duct cleaning hose 82 to the hose mounting ring 60. The outer diameter of the hose mounting ring 60 is preferably about 8 inches which corresponds to industry-standard HVAC duct cleaning hose inner diameter dimension specification. The flexible duct cleaning hose 82 is placed around the hose mounting ring 60 and an annular hose strap clamp 76 is tightened around the cleaning hose 82 to secure to the hose mounting ring 60. In the embodiment of the invention shown in FIGS. 1-5, the length and width of the planar clamp base 20 is about 11 inches. These dimensions allow the magnetic cleaning hose clamp 10 to magnetically mount to standard sized HVAC return duct return ceiling grates that are often found where a drop ceiling has been installed in a building. These duct return ceiling grates typically have an outer metallic frame member that has outer dimensions of 11".times.11" square. The magnetic cleaning hose clamp 10 readily mounts to the outer metallic frame portion of the great thereby obviating the need to cut a hole in such a return duct. Moreover, applicant has found that the magnetic cleaning hose clamps of the invention strongly bond to standard 11".times.11" the ceiling return grates and do not dislodge during normal duct cleaning operations and, when dismounted from the return grate, do not disturb the grate or the adjacent ceiling tiles.

Figure 5:
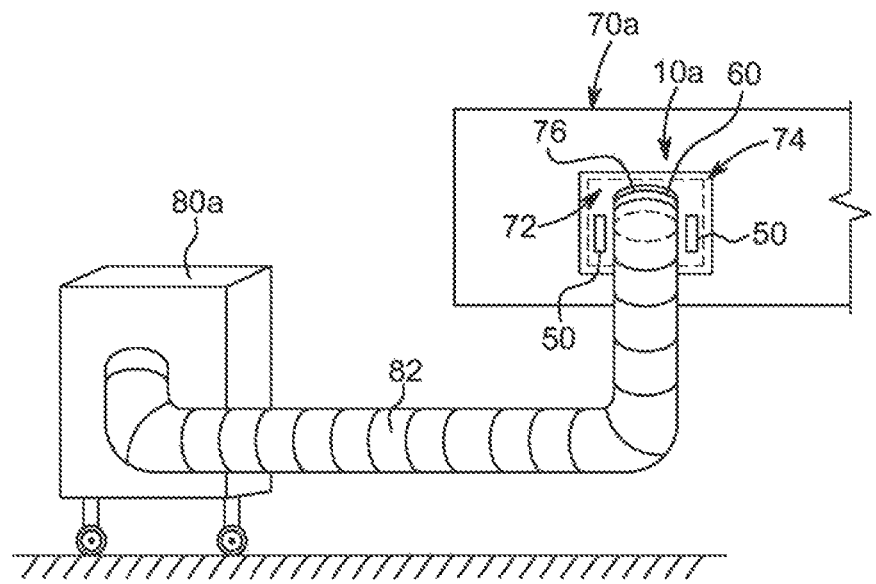
FIG. 5 is a schematic view of the magnetic duct cleaning hose clamp of FIG. 1 attached a duct cleaning base unit and duct.

FIG. 5 shows a schematic view of a duct hose cleaning clamp 10 mounted to a HVAC duct 70. The cleaning technician has cut a square duct cleaning hole 72 (shown in dashed lines) in the side wall of the duct 70. The duct hose cleaning clamp 10 encloses the duct hole 72 within the confines of rim 46 so that compressible sealing member 40 is pressed tightly against the adjacent peripheral portion 74 surrounding the duct cleaning hole 72. The compression of the sealing member 40 creates a nearly airtight seal with the peripheral portion 74 surrounding the duct cleaning hole 72. The duct cleaning hose 82 is mounted to the hose mounting ring 60 and is sealed thereon by hose strap clamp 76. The duct cleaning base unit 80 creates a rapid airflow (using either negative or positive air pressure) within the 72 duct and blows or sucks the dust and other particulates from the interior of the duct 72. The duct hose cleaning clamp 10 can be used to seal a duct cleaning hose to a duct whether the clamp and its attendant hose are located in an upstream location (near a return vent) thereby blowing air into the duct 72 or are located at a downstream location thereby sucking air from the duct (nearer the HVAC unit air inlet).

Figure 6:
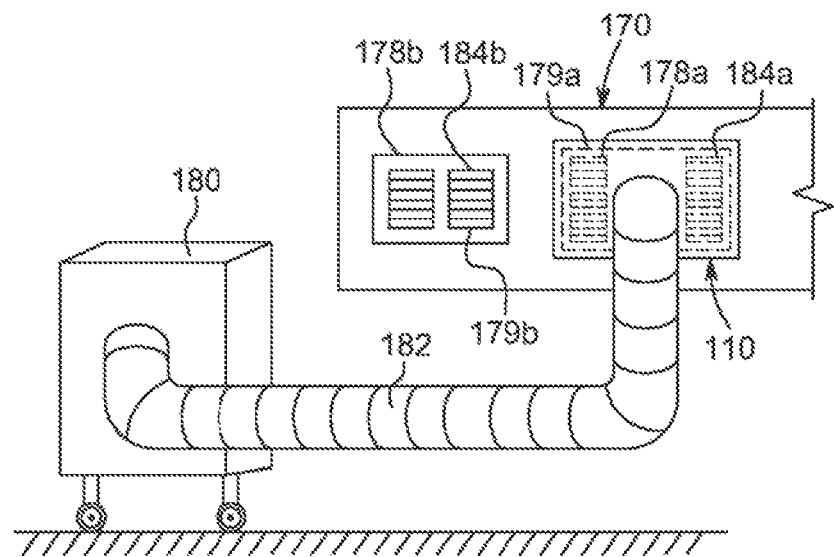
FIG. 6 is a schematic view of a rectangular clamp in accordance with an alternate embodiment of the invention that is attached to a duct cleaning each unit and duct.

FIG. 6 shows a schematic view of a rectangular duct hose cleaning clamp 110 mounted to a HVAC duct 170 at a rectangular duct grate 178a. The duct hose cleaning clamp 110 is similar in all respects to the hose cleaning clamp 10 other than rectangular shape of its planar base 120. Accordingly, the description of FIG. 6 utilizes corresponding 100 series reference numbers to the reference numbers utilized in describing FIGS. 1-5. The height and width of the planar base 120 are select to closely match the outer dimensions of the solid metal frame portion 179 located along the periphery of the grate. Air flows from the base unit 180 into the HVAC duct cleaning clamp 182, through the central aperture 162 of the rectangular duct hose cleaning clamp 110, through the grate openings 184 formed in grate 178, and finally into the duct 182 to blow particulates through the duct to a downstream collection point out. The magnetic attachment pads 130 adhere to the solid metal frame portion 179 of the grate 178 and the compressible sealing member 140 contacts portions of the frame 179 to create a seal. For the sake of clarity, duct grate 178b is shown in FIG. 6 without a clamp mounted to it to more clearly illustrate the features of the grates 178a, 178b. The rectangular duct hose cleaning clamp 110 preferably encloses the peripheral edge of the grate 178 within the confines of rim 146 to assist in creating a good seal between the compressible sealing member 140 and grate 178. The duct cleaning hose 182 is mounted to the hose mounting ring 160 and is sealed thereon by hose strap clamp 176. The planar duct hose cleaning clamps of the invention are to be supplied in a variety of standard sizes including the aforementioned 11.times.11 size, and 8.times.8 size, a 11.times.14 size for residential buildings, a 24 by 24 size, to match industry-standard or commonly used return grate sizes.

Figure 7:
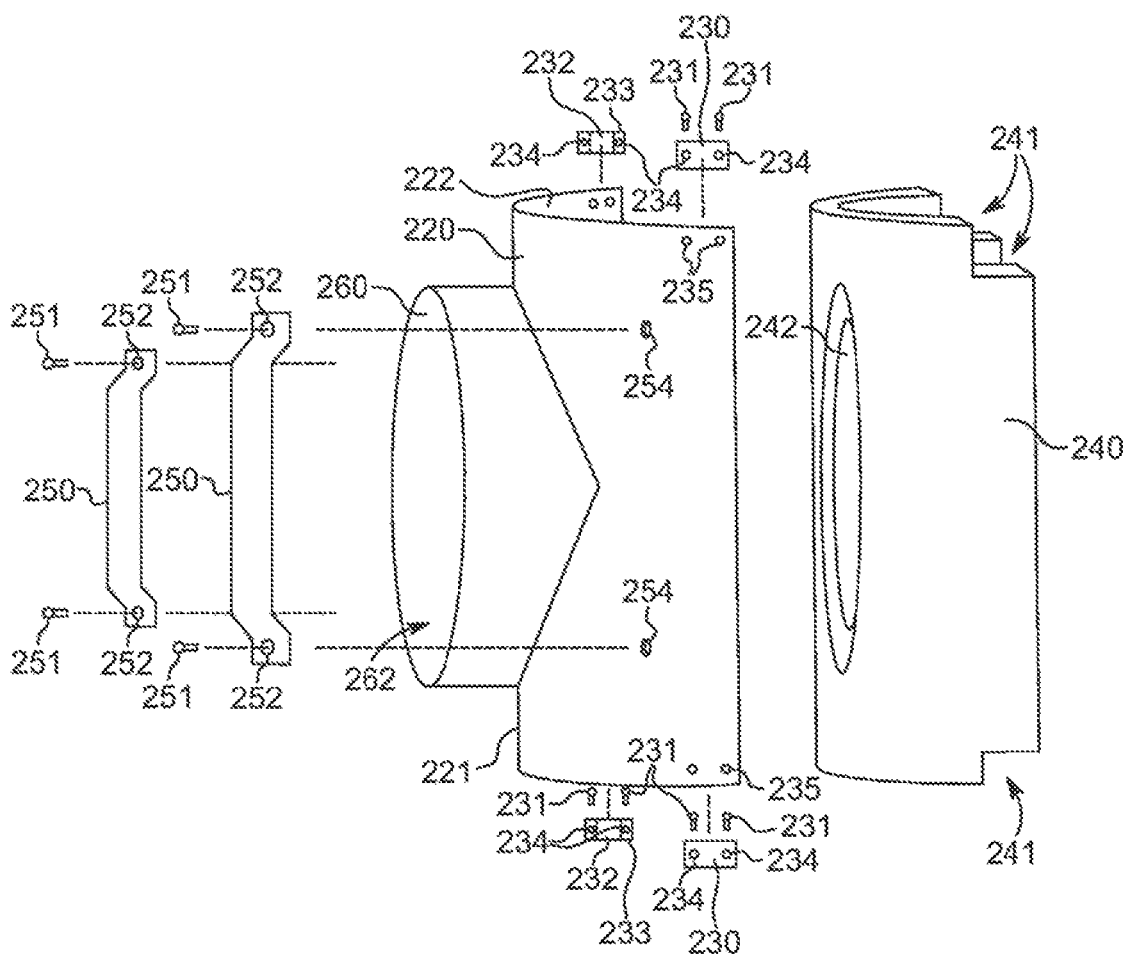
FIG. 7 is a perspective view of a magnetic, curvilinear duct cleaning clamp in accordance with another embodiment of the invention.

FIG. 7 illustrates curvilinear magnetic duct cleaning clamp 210 in accordance with another embodiment of the invention. The curvilinear version of the magnetic duct cleaning clamp 210 is designed to accommodate cylindrically shaped (circular in cross-section) HVAC duct. Such cylindrically are less common than the rectilinear ducts, but are sufficiently common that the applicant has perceived a need to manufacture a quick release magnetic hose cleaning clamp to accommodate cylindrically shaped ducts. The duct hose cleaning clamp 210 is similar in all respects to the hose cleaning clamp 10 other than rectangular shape of its base 220 and compressible sealing material 240. Accordingly, the description of FIG. 7 below utilizes corresponding 200 series reference numbers to the reference numbers utilized in describing FIGS. 1-5 and for the sake of brevity does not discuss substantially similar corresponding structures in detail below.

The manufacturer process for the curvilinear magnetic duct cleaning clamp 210 is substantially similar to that of the planar version 10 with the following exceptions. First, both the clamp base portion 220 and compressible sealing material 240 are curvilinear, rather than planar. The clamp base portion 220 is preferably molded in its curved shape. However, the compressible sealing material is preferably diecut from a flat foam blank and then curved upon being adhered to the curvilinear base portion 220.

Installation and removal of the curvilinear magnetic duct cleaning clamp 210 is similar in most respects to installation of the magnetic duct leaning clamp 10. However, when removing the curvilinear magnetic duct cleaning clamp 210 from a cylindrical duct (not shown) the clamp 220 should the tilted along its radius of curvature, rather than lengthwise.

Figure 8:
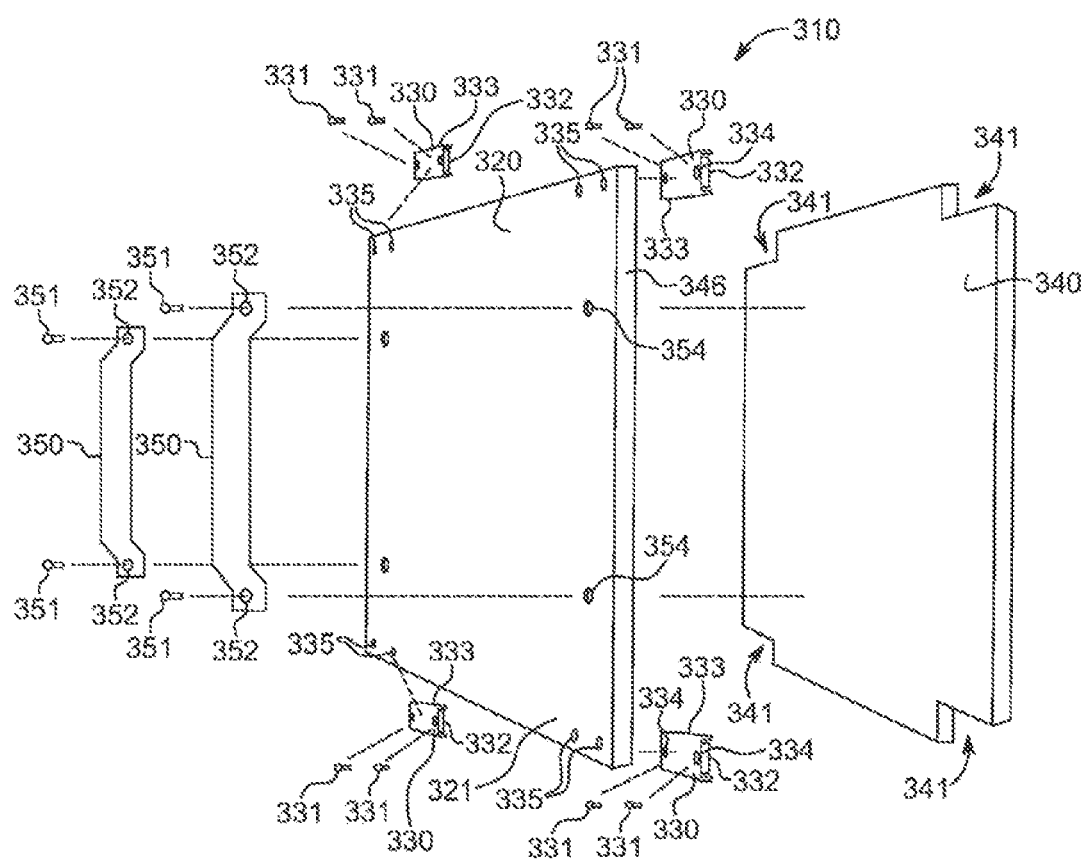
FIG. 8 is a front side, exploded perspective, view of a magnetic duct access door in accordance with still another embodiment of the invention.

FIG. 8 illustrates a planar magnetic duct access door clamp 310 in accordance with another embodiment of the invention. The planar version of the magnetic access door clamp 310 is designed to accommodate planar exterior surface ducts (rectangular or square in cross-section), which require frequent access for inspection of the duct or for frequent cleaning. In food processing facilities, frequent access duct doors are often installed on ducts that provide ventilation to equipment that generates fine particulates, which particulate then enter the building ventilation system or an exhaust ventilation system. Frequent access duct doors are also commonly used in particulate supply ducts that transport particulates between different locations in a food processing facility. To maintain a sanitary environment and to comply with government regulations, food facility ducts require frequent inspection and periodic cleaning, which often necessitates installation of access doors.

The duct access door 310 is similar in most respects to the hose cleaning clamp 10 of FIGS. 1-5 other than the lack of a neck structure, lack of an airflow aperture in the planar base portion 320, and that the compressible sealing material 340 covers the entire back surface 321 of the access door base 320. Accordingly, the description of FIG. 8 below utilizes 300 series reference numbers corresponding to the reference numbers utilized in describing the structure shown FIGS. 1-5, and for the sake of brevity, the description does not discuss substantially similar corresponding structures in detail below.

The manufacturer process for the duct access door 310 is substantially similar to that of the planar version of the duct cleaning clamp 10 with the following exceptions. As mentioned briefly above, the access door base portion 320 of the duct access door 310 lacks an airflow aperture. This is because the entire duct access door structure 310 is removed from the frequent access duct (not shown) each time that access is required to the interior of the frequent access duct. The duct access door 310 is installed in the same manner as the duct hose cleaning clamp 10 described in detail above, except that no duct cleaning hose is attached to the duct access door 310. As there is no airflow aperture in the base portion 320 of the duct access door 310, it is not necessary to have a corresponding aperture in the sealing material 340 of the duct access door base 320. This greater surface area of the sealing material 340 allows the duct access door 310 to seal a wide variety of shapes and sizes of holes cut into the frequent access duct. The process of removal of the duct access door 310 is similar to that described above with regard to duct cleaning clamp 10 in that the duct access door 320 is removed from a frequent access duct by grasping handles 350 in order to tilt one edge of the duct access door 320 to release the magnetic attraction between the magnets 332 on the back surface 322 of the base 320 along one edge and the frequent access duct. The handles 350 are then pulled simultaneously outwardly from the frequent access duct to overcome the magnetic attraction between the remainder of the magnets 332 and the frequent access duct.

Figure 9:
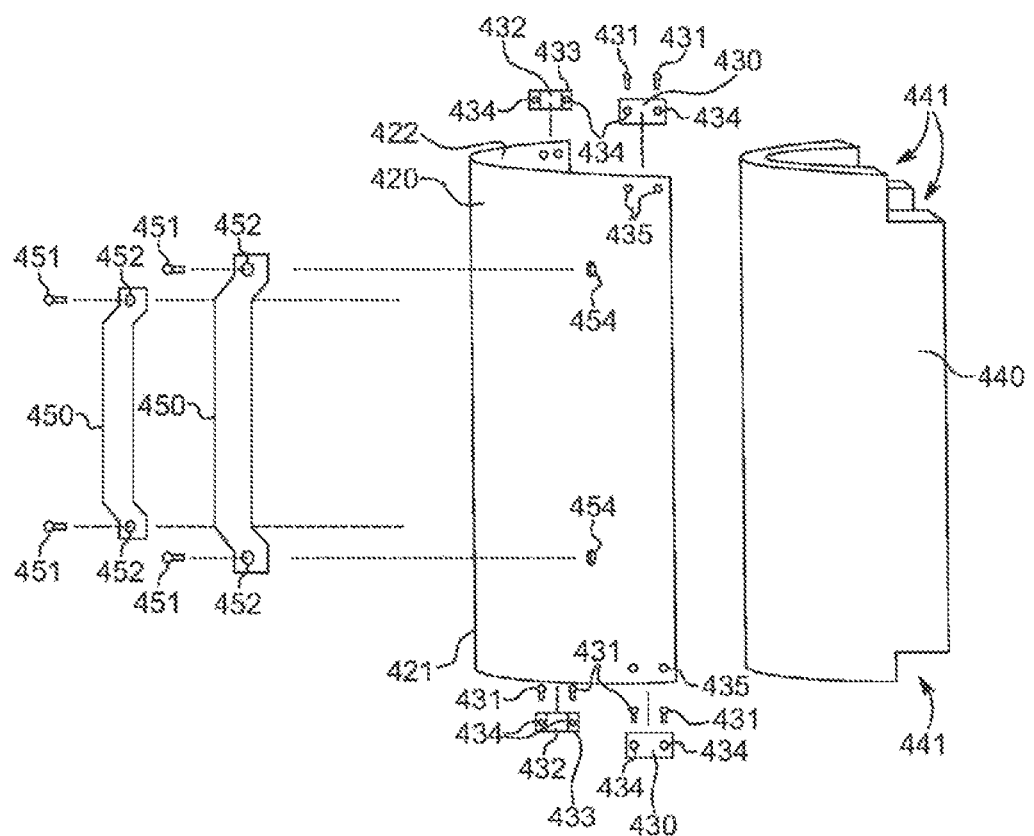
FIG. 9 is a front side, exploded perspective, view of a magnetic curvilinear duct access door in accordance with a further embodiment of the invention.

FIG. 9 illustrates a curvilinear magnetic duct access door 410 in accordance with yet another embodiment of the invention. The curvilinear version of the magnetic duct access door 410 is designed to accommodate frequent access ducts with curved exterior surfaces (round in cross section or elliptical in cross section). Such curved exterior ducts are less common than the rectilinear exterior surface ducts, but are sufficiently common that the applicant has perceived a need to manufacture a duct access door to accommodate curved exterior surface ducts. The duct access door 410 is similar in all respects to the hose cleaning clamp 210 other than other than the lack of a neck structure, lack of an airflow aperture in the curvilinear base portion 420, and that the compressible sealing material 440 covers the entire back surface 421 of the access door base 420. Accordingly, the description of FIG. 9 below utilizes 400 series reference numbers corresponding to the reference numbers utilized in describing FIGS. 1-5 and 7. For the sake of brevity, this specification does not describe substantially similar corresponding structures in detail again below.

The manufacturer process for the curvilinear magnetic access door 410 is substantially similar to that of the curvilinear version 210 with the following exceptions. As mentioned briefly above, the curvilinear access door base portion 420 of the duct access door 410 lack an airflow aperture. This is because the entire curvilinear duct access door structure 410 is removed from the frequent access duct (not shown) each time that access is required to the interior of the frequent access duct. The duct access door 410 is installed in the same manner as the hose cleaning clamp 10 described in detail above, except that no duct cleaning hose is attached to the duct access door 410. As there is no airflow aperture in the curvilinear base portion 420 of the curvilinear duct access door 410, it is not necessary to have a corresponding aperture in the sealing material 440 of the duct access curvilinear door base 420. This greater surface area for the sealing material 440 allows the curvilinear duct access door 410 to seal a wide variety of shapes and sizes of holes cut into the frequent access duct. The process of removal of the duct access door 410 is similar to that described above with regard to duct cleaning clamp 10 and curvilinear duct cleaning clamp 210 in that the duct access door 420 is removed from a frequent access duct by grasping handles 350 in order to pivot the duct access door 320 along the axis of one its straight edges to release the magnetic attraction between the magnets 432 an duct along the opposite straight edge of the rectilinear base 420. The handles 450 are then pulled simultaneously outwardly from the frequent access duct to overcome the magnetic attraction between the remainder of the magnets 432 on the other straight edge and the frequent access duct.

In a similar manner to that described for clamp base portion 220, curvilinear access door base portion 420 is preferably molded from a thermoplastic resin in its curved shape similar to clamp base portion 220. In contrast, compressible sealing material 420 is preferably die-cut from a flat foam blank and then curved upon being adhered to the curvilinear base portion 420.

Other embodiments, combinations and modifications of this invention will occur readily to those of ordinary skill in the art in view of these teachings. Therefore, this invention is to be limited only by the following claims, which include all such embodiment methods, and modifications when viewed in conjunction with the above specification and accompanying drawings.

The invention claimed is:

1. An improved duct access door for providing temporary access to the interior of a duct through a duct opening during a reoccurring access event and for repeatedly sealing the duct opening after each access event, the improved duct access door comprising:
a duct access door base having a front surface and a back surface;
a plurality of magnets arranged around the periphery of the back surface of the duct access door base;
the duct access door base being substantially imperforate within the periphery of the back surface in order to close the duct opening;
a compressible sealing member located between the plurality of magnets on the back surface of the duct access door base; and,
at least one handle portion extending from the front surface of the duct access door base;
the handle portion having a gripping portion spaced from the front surface, and an attachment portion extending in a direction away from the front surface but located substantially within a projected perimeter of the front surface that is projected perpendicularly away from the front surface, and connecting the gripping portion to the door base, and the handle portion shaped to provide a void arranged behind the gripping portion to allow a user's hand to surround the gripping portion to remove the door base from the duct against the urging of the magnets;
wherein the duct access door base has a peripheral rim portion extending from its back surface for retaining the sealing member and the plurality of magnets to ensure a seal with the duct and wherein the distance that the peripheral rim portion extends from the back surface of the duct access door base is less than the thickness of the compressible sealing member.

2. The improved duct access door of claim 1 wherein the duct access door base is substantially planar.

3. The improved duct access door of claim 1 wherein the duct access door base is substantially curvilinear with a radius of curvature matching the predetermined radius of curvature of a round duct.

4. The improved duct access door of claim 1 wherein the duct access door base is molded from a thermoplastic resin.

5. The improved duct access door of claim 1 wherein the compressible sealing member is a resilient foam pad covering substantially the entire back surface of the duct access door base whereby the improved duct access door can accommodate significant variances in the shape and size of the access hole cut in the duct.

6. The improved duct access door of claim 1 wherein the each of the plurality of magnets has a magnetic pull force rating of at least 25 pounds per magnet.

7. An improved duct access door for providing temporary access to the interior of a duct through a duct opening during a reoccurring access event and for repeatedly sealing the duct after each access event, the improved duct access door comprising:
a duct access door base having a front surface and a back surface, the door base sized and shaped to close the duct opening;
a plurality of magnets arranged around the periphery of the back surface of the duct access door base;
the duct access door base being substantially imperforate within the periphery of the back surface in order to close the duct opening;
the duct access door base being mechanically unattached to the duct and held to the duct by the plurality of magnets; and a compressible sealing member located between the plurality of magnets on the back surface of the duct access door base wherein the duct access door base has a peripheral rim portion extending from its back surface for retaining the sealing member to ensure a seal with the duct and wherein the distance that the peripheral rim portion extends from the back surface of the duct access door base is less than the thickness of the compressible sealing member; and further comprising at least one handle portion extending from the front surface of the door base, extending in a direction away from the front surface, the handle portion having a gripping portion spaced from the front surface.

8. The improved duct access door of claim 7 wherein the duct access door base is substantially planar.

9. The improved duct access door of claim 7 wherein the duct access door base is substantially curvilinear with a radius of curvature matching the predetermined radius of curvature of a round duct.

10. The improved duct access door of claim 7 wherein the duct access door base is molded from a thermoplastic resin.

11. The improved duct access door of claim 7 wherein the compressible sealing member is a resilient foam pad covering substantially the entire back surface of the duct access door base whereby the improved duct access door can accommodate significant variances in the shape and size of the access hole cut in the duct.

12. The improved duct access door of claim 7 wherein the each of the plurality of magnets has a magnetic pull force rating of at least 25 pounds per magnet.

13. The improved duct access door of claim 7, wherein the at least one handle portion includes an attachment portion connecting the gripping portion to the door base, and the handle portion is shaped to provide a void arranged behind the gripping portion to allow a user's hand to surround the gripping portion to remove the door base from the duct against the urging of the magnets.

14. The improved duct access door of claim 13 wherein the duct access door base is substantially planar.

15. The improved duct access door of claim 13 wherein the duct access door base is substantially curvilinear with a radius of curvature matching the predetermined radius of curvature of a round duct.

16. The improved duct access door of claim 13 wherein the each of the plurality of magnets has a magnetic pull force rating of at least 25 pounds per magnet.

* * * * *